US008373773B2

(12) United States Patent  
Matsumoto et al.

(10) Patent No.: US 8,373,773 B2  
(45) Date of Patent: Feb. 12, 2013

(54) IMAGING APPARATUS FOR GENERATING A WIDE-ANGLE IMAGE

(75) Inventors: Kosuke Matsumoto, Akishima (JP); Naotomo Miyamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 137 days.

(21) Appl. No.: 13/071,758

(22) Filed: Mar. 25, 2011

(65) Prior Publication Data

US 2011/0234855 A1 Sep. 29, 2011

(30) Foreign Application Priority Data

Mar. 25, 2010 (JP) ................................ 2010-070552

(51) Int. Cl.  
*H04N 5/76* (2006.01)

(52) U.S. Cl. ........... 348/231.99; 348/222.1; 348/333.11; 382/284

(58) Field of Classification Search ............. 348/231.99, 348/222.1, 333.11; 382/284  
See application file for complete search history.

(56) References Cited

U.S. PATENT DOCUMENTS

| | | | | |
|---|---|---|---|---|
| 5,930,405 | A * | 7/1999 | Chida | 382/284 |
| 6,930,703 | B1 * | 8/2005 | Hubel et al. | 348/37 |
| 2002/0030748 | A1 * | 3/2002 | Kitaguchi et al. | 348/218 |
| 2004/0165075 | A1 * | 8/2004 | Okada et al. | 348/207.99 |
| 2004/0189674 | A1 * | 9/2004 | Zhang et al. | 345/629 |
| 2007/0085913 | A1 * | 4/2007 | Ketelaars et al. | 348/239 |

FOREIGN PATENT DOCUMENTS

JP 2002-027312 A 1/2002

* cited by examiner

*Primary Examiner* — Sinh Tran  
*Assistant Examiner* — Paul Berardesca  
(74) *Attorney, Agent, or Firm* — Holtz, Holtz, Goodman & Chick, PC

(57) ABSTRACT

An imaging apparatus including a capturing section which captures an image at a first viewing angle, a capturing control section which performs consecutive image capturing by the capturing section, a setting section which sets areas to be captured at the first viewing angle to generate a composite image reproducing a captured image at a second viewing angle by combining captured images, a judgment section which judges whether a captured image is suitable for any one of the set areas, and a recording control section which corresponds the captured image with an area and records the capture image in a recording section when the captured image is suitable, wherein the judgment section further judges whether the captured image is more suitable for an area than previously recorded by corresponding a recorded image in comparison with a previously recorded image, when an image that was previously recorded in the record means exists.

10 Claims, 13 Drawing Sheets

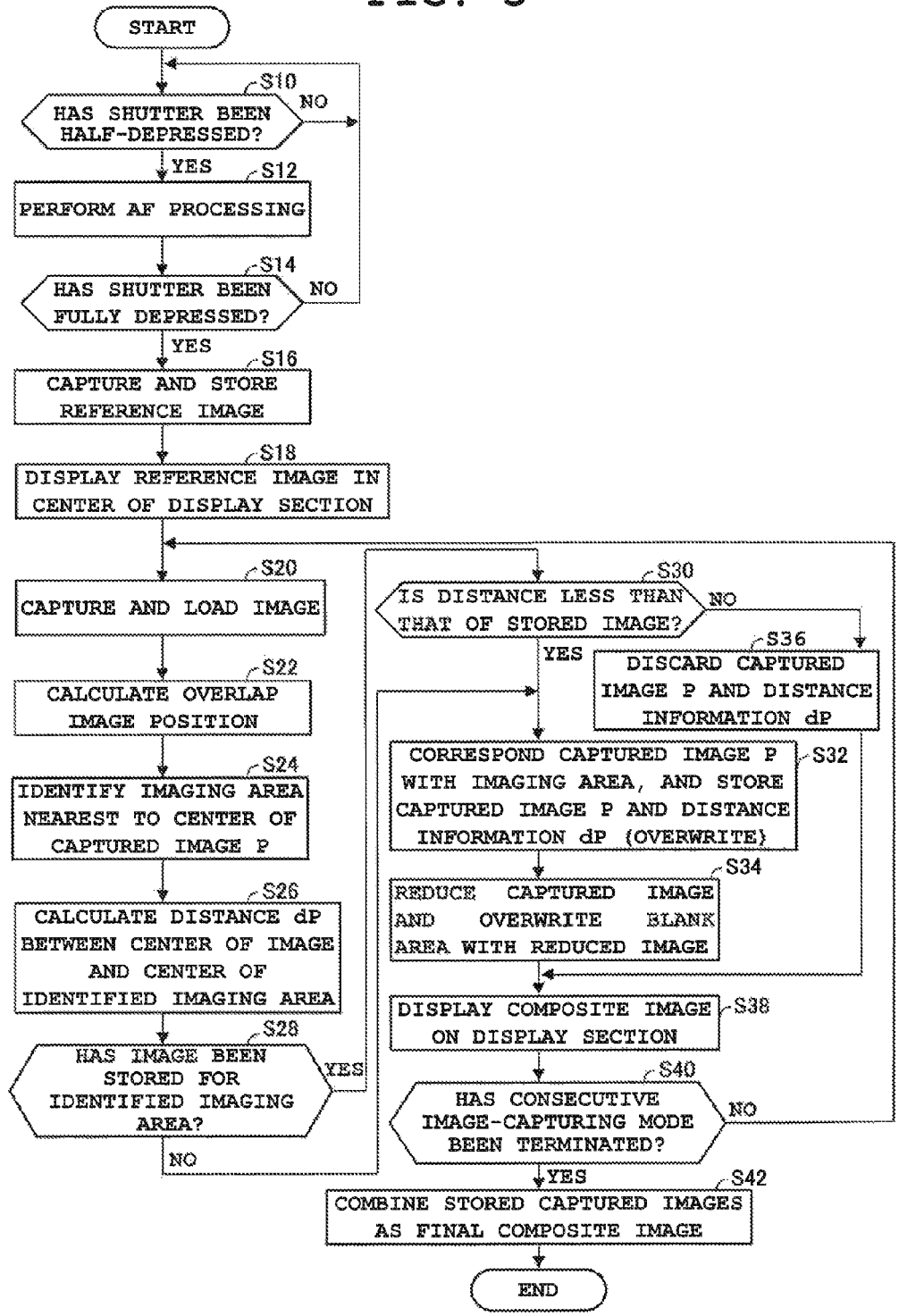

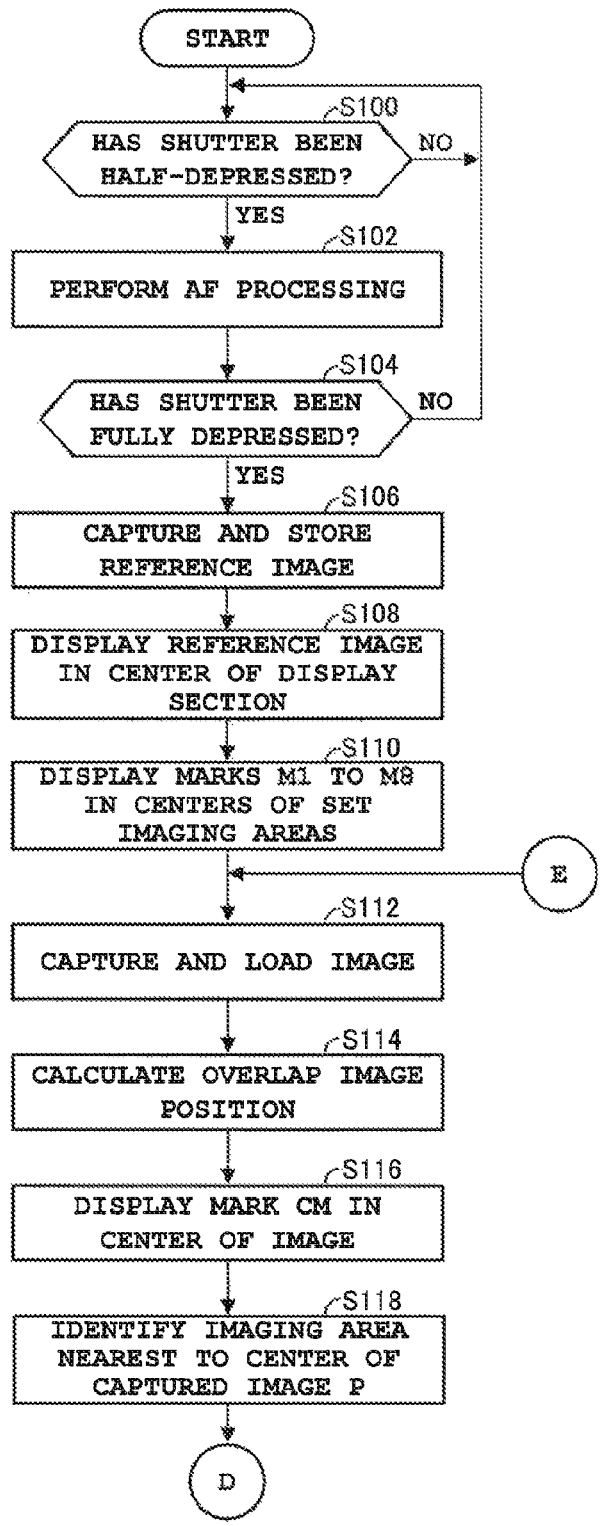

IMAGING APPARATUS FOR GENERATING A WIDE-ANGLE IMAGE

CROSS-REFERENCE TO RELATED APPLICATION

This application is based upon and claims the benefit of priority from the prior Japanese Patent Application No. 2010-070552, filed Mar. 25, 2010, the entire contents of which is incorporated herein by reference.

BACKGROUND OF THE INVENTION

1. Field of the Invention

The present invention relates to an imaging apparatus and a recording medium with a program recorded therein.

2. Description of the Related Art

In digital cameras, mobile phones having an imaging function, etc., the limit of a viewing angle is dependent on the hardware specification of the device body, such as the focal distance of the lens, the size of the image sensor, and the like.

Therefore, a technique is known that, when acquiring a wide-angle image that exceeds a hardware specification, such as when performing panoramic imaging, consecutively captures images while moving the imaging apparatus in a certain direction, and generates a wide-angle image by combining the acquired plurality of images (refer to, for example, Japanese Patent Application Laid-Open (Kokai) Publication No. 2002-027312).

However, there is a problem in the above-described conventional technique. Although it is effective when a viewing angle is widen in one direction, a direction in which images should be captured during consecutive image capturing is difficult to know when a wide-angle image that spreads in two directions is to be generated. In addition, because all images acquired through consecutive image capturing are required to be recorded regardless of suitability for panoramic image composition, a large memory capacity is required.

SUMMARY OF THE INVENTION

An object of the present invention is to provide an imaging apparatus and a recording medium with a program stored therein by which images necessary to generate a wide-angle image can be easily and efficiently acquired.

In order to achieve the above-described object, in accordance with one aspect of the present invention, there is provided an imaging apparatus comprising: a capturing section which captures an image at a first viewing angle; a capturing control section which performs consecutive image capturing at a predetermined cycle by the capturing section; a setting section which sets a plurality of areas to be captured at the first viewing angle so as to generate a composite image reproducing a captured image at a second viewing angle wider than the first viewing angle by combining a plurality of images acquired by a plurality of image capturing operations performed by the capturing control section; a judgment section which judges whether or not a captured image in the consecutive image capturing by the capturing control section is a suitable image for any one of the plurality of areas set by the setting section; and a recording control section which corresponds the captured image with an area and records the captured image in a recording section, when the judgment section judges that the captured image is a suitable image; wherein the judgment section further judges whether or not the captured image in the consecutive image capturing by the capturing control section is more suitable for an area than previously recorded by corresponding a recorded image in comparison with a previously recorded image, when an image that was previously recorded in the record means exists.

In accordance with another aspect of the present invention, there is provided a non-transitory computer-readable storage medium having stored thereon a program that is executable by a computer in an imaging apparatus including a capturing section which captures an image at a first viewing angle and a memory for recording images, the program being executable by the computer to perform functions comprising: capturing control processing for performing consecutive image capturing at a predetermined cycle by the capturing section; setting processing for setting a plurality of areas to be captured at the first viewing angle so as to generate a composite image reproducing a captured image at a second viewing angle wider than the first viewing angle by combining a plurality of images acquired by a plurality of image capturing operations performed in the capturing control processing; judgment processing for judging whether or not a captured image in the consecutive image capturing in the capturing control processing is a suitable image for any one of the plurality of areas set in the setting processing; and recording control processing for corresponding the captured image with an area and recording the captured image in a memory, when the judgment processing judges that the captured image is a suitable image; wherein the judgment processing further judges whether or not the captured image in the consecutive image capturing by the capturing control section is more suitable for an area than previously recorded by corresponding a recorded image in comparison with a previously recorded image, when an image that was previously recorded in the record means exists.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 5 is a flowchart for explaining operations of the digital camera 1 according to the first embodiment;

FIG. 11 is a flowchart for explaining operations of a digital camera according to a third embodiment;

DETAILED DESCRIPTION OF THE PREFERRED EMBODIMENTS

The preferred embodiments of the present invention will hereinafter be described with reference to the drawings. However, the scope of the invention is not limited to the illustrated examples.

A. First Embodiment

A-1. Configuration According to the First Embodiment

Figure 1:
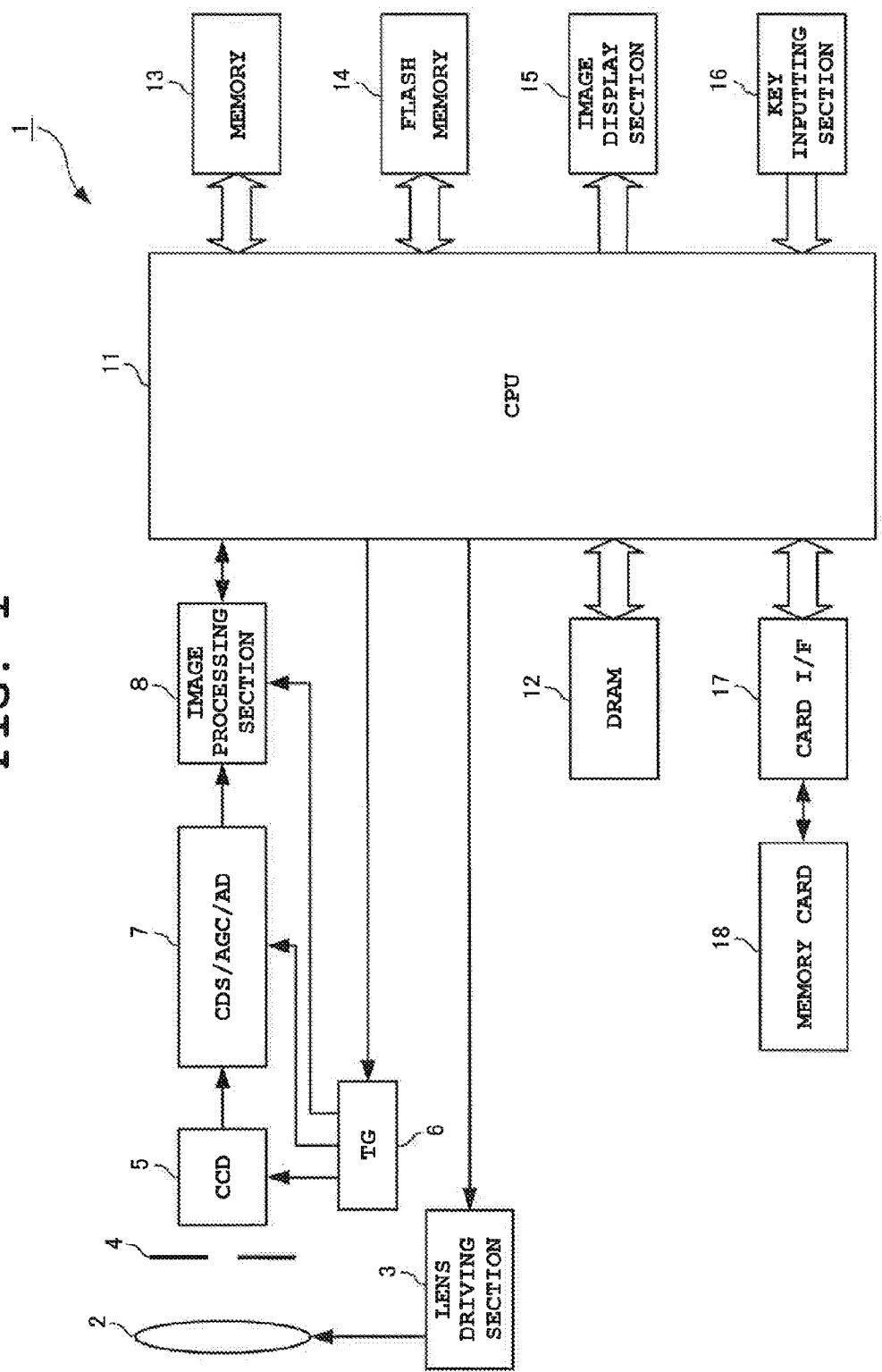
FIG. 1 is a block diagram of showing the structure of a digital camera 1 according to a first embodiment of the present invention.

FIG. 1 is a block diagram showing the structure of a digital camera according to a first embodiment of the present invention. In FIG. 1, a digital camera 1 includes an imaging lens 2, a lens driving section 3, a shutter-aperture 4, a charge-coupled device (CCD) 5, a timing generator (TG) 6, a unit circuit 7, an image processing section 8, a central processing unit (CPU) 11, a dynamic random access memory (DRAM) 12, a memory 13, a flash memory 14, an image display section 15, a key inputting section 16, a card interface (I/F) 17, and a memory card 18.

The imaging lens 2 includes a focus lens, a zoom lens, and the like, and is connected with the lens driving section 3. The lens driving section 3 includes a focus motor and a zoom motor that respectively drive the focus lens and the zoom lens constituting the imaging lens 2 in an optical axis direction, and a focus motor driver and a zoom motor driver that drive the focus motor and the zoom motor in accordance with control signals from the CPU 11.

The shutter-aperture 4 includes a driver circuit not shown, and the driver circuit operates the shutter-aperture 4 in accordance with control signals sent from the CPU 11. This shutter-aperture 4 controls the amount of light irradiated from the imaging lens 2. The CCD (image sensor) 5 (capturing section), which is driven in accordance with timing signals of a predetermined frequency generated by the TG 6, converts the light of a subject projected through the imaging lens 2 and the shutter-aperture 4 to electrical signals, and outputs them to the unit circuit 7 as imaging signals.

The unit circuit 7, which is also driven in accordance with timing signals of a predetermined frequency generated by the TG 6, includes a correlated double sampling (CDS) circuit that performs correlated double sampling on imaging signals outputted from the CCD 5 and holds the sampled imaging signals, an automatic gain control (AGC) circuit that performs automatic gain control on the sampled imaging signals, and an analog-to-digital (A/D) converter that converts the automatic-gain-controlled analog imaging signals to digital signals. Imaging signals outputted from the CCD 5 are sent to the image processing section 8 through this unit circuit 7, as digital signals.

The image processing section 8, which is also driven in accordance with timing signals of a predetermined frequency generated by the TG 6, performs image processing of image data sent from the unit circuit 7 (pixel interpolation processing, γ-correction, luminosity color difference signal generation, white balance processing, exposure correction processing, etc.), compression and extension processing of image data (such as compression and extension in Joint Photographic Experts Group (JPEG) format, Motion-JPEG [M-JPEG] format or Moving Picture Experts Group (MPEG) format), processing for combining a plurality of captured images, etc.

The CPU 11 (capturing control section, setting section, judgment section, recording control section, first display control section, second display control section, and composition section) is a single-chip microcomputer that controls each section of the digital camera 1. In particular, according to the first embodiment, the CPU 11 controls each section such that a plurality of images are consecutively captured at a predetermined cycle (time interval), the captured images are combined so as to be partially overlapped with each other (such as by α-blending), and a single composite image that appears to have been captured at a wide angle is generated. The details of this image composition will be described hereafter.

The DRAM 12 is used as a buffer memory that temporarily stores image data sent to the CPU 11 after being captured by the CCD 5, and as a working memory of the CPU 11. The memory 13 stores a program necessary for the CPU 11 to control each section of the digital camera 1 and data necessary to control each section, and the CPU 11 performs processing based on this program. The flash memory 14 and the memory card 18 are recording media that store image data captured by the CCD 5 and the like.

The image display section 15 (display section) includes a color liquid crystal display (LCD) and a driver circuit thereof. In an imaging stand-by state, the image display section 15 displays a subject captured by the CCD 5 as a through image. Also, the image display section 15 displays a recorded image that has been read out from the flash memory 14 or the memory card 23 and expanded when it is replayed. In addition, according to the first embodiment, the image display section 15 in the wide-angle imaging mode displays a composite image generated by a plurality of consecutively captured images being sequentially combined, a mark that guides the user to an image capturing direction, etc. The key inputting section 16 includes a plurality of operation keys, such as a shutter switch (SW), a zoom SW, a mode key, a SET key, and a cross-shaped key, and outputs operation signals based on key operations by the user to the CPU 11. The memory card 18 is detachably mounted on the card I/F 17 by a card slot (not shown) in the main body of the digital camera 1.

Figure 2:
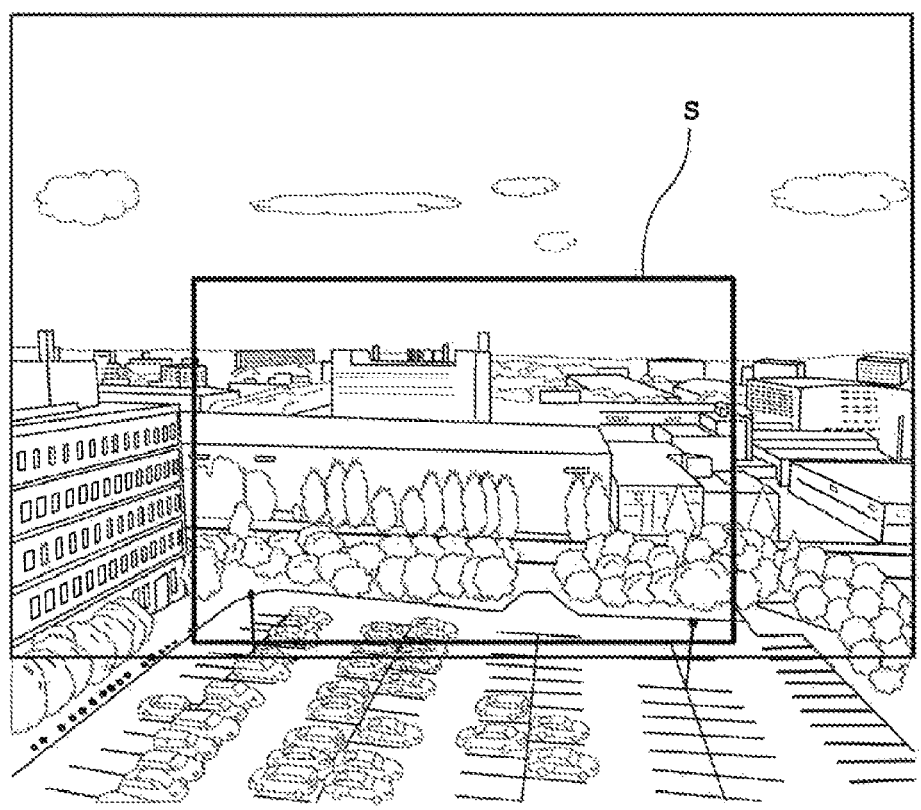
FIG. 2 is a conceptual diagram for explaining a wide-angle imaging mode of the digital camera 1 according to the first embodiment.

FIG. 2 is a conceptual diagram for explaining the wide-angle imaging mode of the digital camera 1 according to the first embodiment. For example, suppose the case where a landscape such as that shown in FIG. 2 is to be captured by the digital camera 1. A viewing angle that is wider than a viewing angle S of the imaging system of the digital camera 1 is required to capture the landscape of the desired area. Accordingly, in this case, the entire desired landscape cannot be captured by a single shot.

Figure 3:
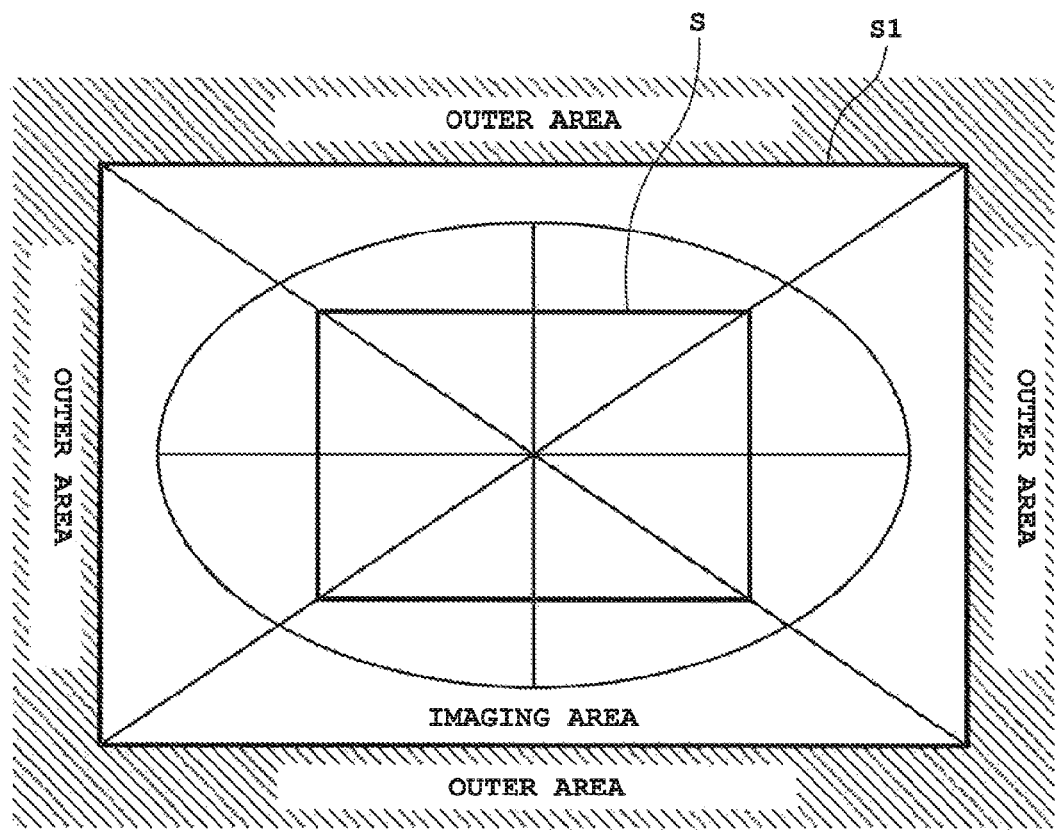
FIG. 3 is a conceptual diagram showing a relationship between the viewing angle of a lens and a composite image acquired in the wide-angle imaging mode of the digital camera 1 according to the first embodiment.

In the description below, the landscape shown in FIG. 2 will be described, being schematized as shown in FIG. 3 to clarify the imaging area, the viewing angle for imaging, etc. In FIG. 3, a viewing angle S1 is the size (viewing angle) of an image with a wide viewing angle that is ultimately generated, in relation to the viewing angle S of the imaging system of the digital camera 1. Even if the outer side is captured, this outer area is not saved in the final image.

In the first embodiment, an array for writing an image is secured in the memory (DRAM 12). This array is referred to as a canvas for convenience. The canvas indicates an imaging area that is reproduced by a generated composite image with a wide viewing angle. That is, a plurality of captured images that are positioned and combined so as to be partially overlapped with each other overwrite the canvas. Then, the area on the canvas in which the image has been written is extracted from the composite image, whereby an image with a wide viewing angle is generated.

In the first embodiment, the first captured image in the wide-angle imaging mode serves as a reference image (equivalent to the image at the viewing angle S in FIG. 3). This is an area, for example, twice the height and twice the width of the reference image which is set as the canvas (the imaging area S1 in FIG. 3). Then, the reference image is pasted in the center of the canvas. Note that the size of the canvas may be other than twice the height and width.

Also note that the reference image is not necessarily required to be placed in the center of the canvas and, for example, may be placed in the upper-left corner or the upper-right corner. Next, a plurality of captured images are positioned and combined so as to be partially overlapped with the reference image (or composite image). Then, the canvas is overwritten by the composite image. Further note that block matching, for example, can be used as a method for the positioning. In addition, a method can be used in which projection conversion or the like is performed and the images are overlapped using a technique such as α-blending, as a method to overwrite the canvas.

Figure 4:
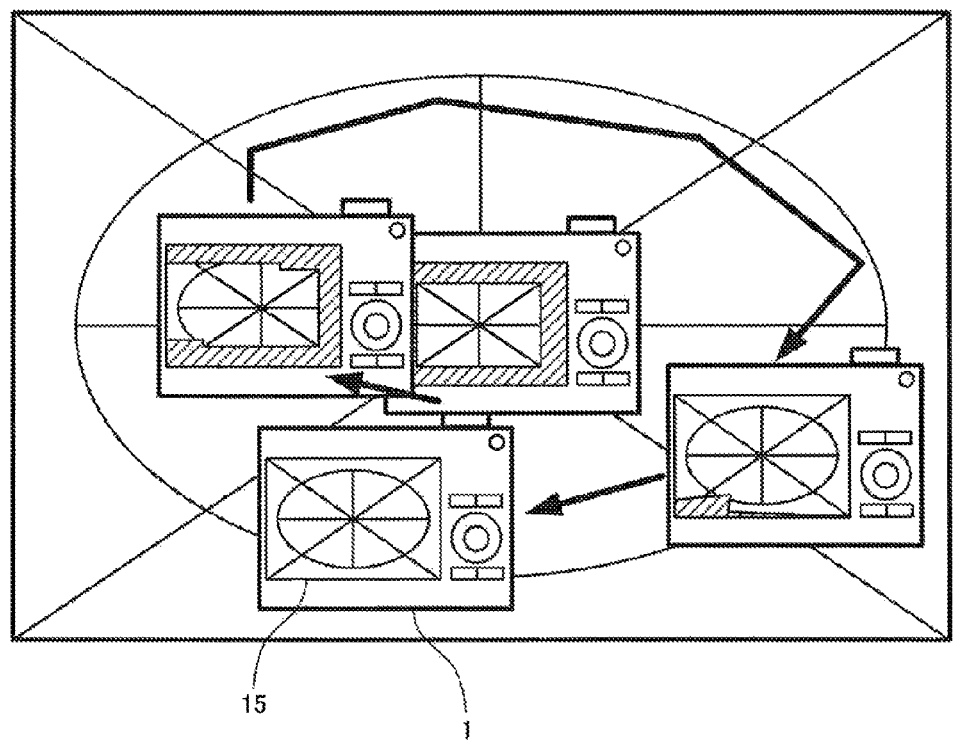
FIG. 4 is a schematic diagram for explaining user operation in the wide-angle imaging mode of the digital camera 1 according to the first embodiment.

FIG. 4 is a schematic diagram for explaining user operation in the wide-angle imaging mode of the digital camera 1 according to the first embodiment. As described above, the desired landscape cannot be captured in its entirety by a single shot. Accordingly, when capturing the desired landscape, the user, for example, depresses the shutter SW (half-depression→full depression) towards the center area thereof, and the digital camera 1 continually captures images at a predetermined cycle (time interval) to acquire a composite image with a wide viewing angle. At this time, the user is required to move the digital camera 1 in a circular motion as indicated by the arrow in FIG. 4, so as to change the image capturing direction of the digital camera 1 to capture all images necessary for acquiring a composite image with a wide viewing angle. However, it is hard for the user to know how to move the digital camera 1 or whether or not necessary images are being taken without fail.

In addition, simply capturing images consecutively at a predetermined cycle (time interval) while the user is moving the image capturing direction of the digital camera 1 to cover the desired landscape results in capturing duplicate images or a short of necessary images. Accordingly, a large number of images are required to be stored to acquire images necessary for generating an image with a wide viewing angle, which strains the memory capacity.

Therefore, in the first embodiment, a plurality of imaging areas are set in advance on the above-described canvas to acquire an image with a wide viewing angle, and operation is controlled during consecutive image capturing at a predetermined cycle (time interval) such that, when a more suitable image is stored for a set image area, only this single image is kept as an image used for image composition, and other images (images other than the nearest image) are discarded even if they have been captured. Then, when necessary images are captured for all the imaging areas, these captured images are combined so as to be partially overlapped, whereby an image with a wide viewing angle is acquired.

As just described, in the first embodiment, only a single most suitable image (an image nearest to a set imaging area) is stored for each of a plurality of set imaging areas. Therefore, a memory having a capacity for storing a large number of images is not required. That is, an image with a wide viewing angle can be acquired with minimum memory capacity.

In addition, because only a single suitable image is stored for each of a plurality of set imaging areas and other images are discarded, images can be consecutively and unlimitedly captured until an image required for generating an image with a wide viewing angle is captured. As a result, imaging is continued until images completely covering an image with a wide viewing angle are acquired, whereby the exactness of an image with a wide viewing angle is improved. Moreover, because a large number of images are not required to be stored, each individual image can be captured at a higher resolution, whereby the quality of an image with a wide viewing angle is improved.

Furthermore, in the wide-angle imaging mode of the first embodiment, an image formed in the CCD 5 showing a view in the current image capturing direction of the digital camera 1 is displayed on the image display section 15 in live view as a preview image (low resolution). In addition, a reduced image (low resolution) is generated from a captured image (high resolution) stored as a more suitable image for a set imaging area, and after the generated reduced image is combined with a reference image (or a composite image, both of which are reduced images) so as to be partially overlapped with each other, a composite image composed of these reduced images is displayed on the image display section 15. In this way, in the wide-angle imaging mode, images are displayed on the image display section 15 in live view as preview images (low resolution), and a reduced image of the composite image is displayed on the image display section 15. Therefore, the user can easily confirm a direction in which the digital camera should be pointed.

A-2. Operations of the First Embodiment

Next, operations of the above-described first embodiment will be described.

FIG. 5 is a flowchart for explaining operations of the digital camera 1 according to the first embodiment. FIG. 6A to FIG. 6D are schematic diagrams showing display examples of the digital camera 1 according to the first embodiment. FIG. 7A to FIG. 7D are conceptual diagrams showing operations of the digital camera 1 according to the first embodiment.

Note that, while the processing described hereafter is running, the digital camera 1 loads images formed in the CCD 5 at predetermined time intervals (several tens of frames per second) and displays the images on the image display section 15 in live view as preview images (low resolution).

Regarding the display position of a preview image on the image display section 15, in ordinary imaging, the center of the image display section 15 and the center of a preview image coincide (a photographic subject in an image capturing direction is displayed in the center of the image display section 15). However, in the wide-angle imaging mode of the first embodiment, the position of a preview image on the screen of the image display section 15 is moved according to the image capturing direction of the digital camera 1, with reference to the image capturing position of the reference image.

For example, after capturing a reference image, when the user moves the image capturing direction of the digital camera 1 in the right-hand direction (relative to the reference image capturing position), the preview image also moves on the screen of the image display section 15, in the right-hand direction relative to the reference image. Conversely, when the user moves the image capturing direction in the left-hand direction, the preview image also moves in the left-hand direction relative to the reference image. The same applies to when the image capturing direction is moved in the upward or downward direction. Hereafter, the imaging and the generation of an image with a wide viewing angle will be described with the view of the positional control of a preview image such as this.

Figure 7A:
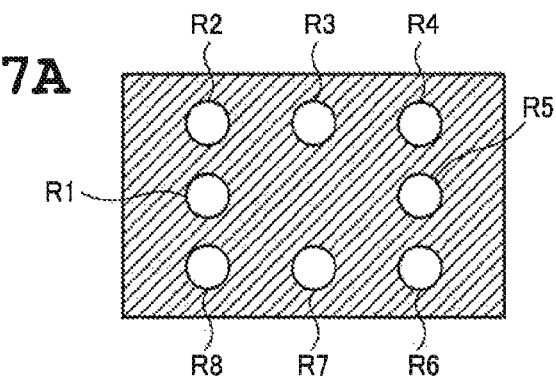
FIG. 7A to FIG. 7D are conceptual diagrams showing operations of the digital camera 1 according to the first embodiment.

In addition, as initial processing in the consecutive image capturing mode, imaging areas are set in the canvas in advance according to the number of necessary images required for generating an image with a wide viewing angle, as shown in FIG. 7A. In the example shown in FIG. 7A, the canvas is divided into eight imaging areas R1 to R8 excluding the reference image, and a center position (circle mark) of each imaging area R1 to R8 is set.

First, the CPU 11 judges whether or not the shutter SW has been half-depressed (Step S10). When judged that the shutter SW has not been half-depressed, the CPU 11 repeatedly performs Step S10. Conversely, when judged that the shutter SW has been half-depressed, the CPU 11 performs auto-focus (AF) processing (Step S12) and judges whether or not the shutter SW has been fully depressed (Step S14). When judged that the shutter SW has not been fully depressed, the CPU 11 repeatedly performs Step S10 and Step S12.

Figure 6A:
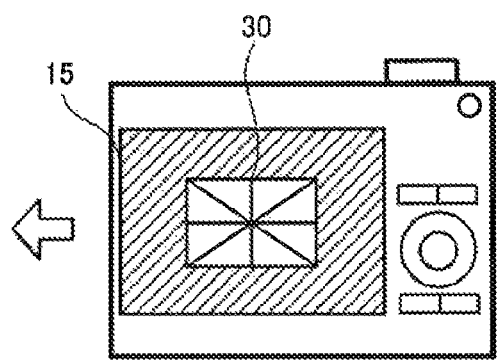
FIG. 6A to FIG. 6D are schematic diagrams for explaining operations of the digital camera 1 and display examples of an image display section according to the first embodiment.

Conversely, when judged that the shutter SW has been fully depressed, the CPU 11 first captures a first image (high resolution) as a reference image 30 and stores the captured image in the DRAM 12 (Step S16). Next, as shown in FIG. 6A, the CPU 11 displays a reduced image of the reference image 30 in the center of the image display section 15 (Step S18).

Then, the user moves the digital camera 1 in a circular motion as indicated by the arrow shown in FIG. 4 to change the image capturing direction of the digital camera 1. For example, when the user moves the image capturing direction of the digital camera 1 towards the left-hand side as shown in FIG. 6B, a preview image 31 also moves in the left-hand direction relative to the reference image 30.

Next, in the digital camera 1, the CPU 11 captures and loads an image P (high resolution) (Step S20), and calculates an overlap image position (Step S22). The calculation of an overlap image position herein refers to, for example, a calculation in which the center position (coordinates) of a captured image is calculated, and after the captured image and the reference image (or composite image) are positioned so as to be partially overlapped with each other, the position of the captured image within the canvas (or a relative position relative to the reference image) is calculated.

Next, the CPU 11 identifies the imaging area nearest to the center position of the captured image P (Step S24), and calculates the distance dP between the center of the captured image P and the center of the identified imaging area (Step S26). Then, the CPU 11 judges whether or not an image has already been stored for the imaging area (Step S28). When judged that an image has not yet been stored, or in other words, When judged that the captured image P is the first image for the imaging area, the CPU 11 corresponds the captured image P with the imaging area, and stores the captured image P and the distance information dP in the DRAM 12 (overwrites the DRAM 12) (Step S32).

Figure 6B:
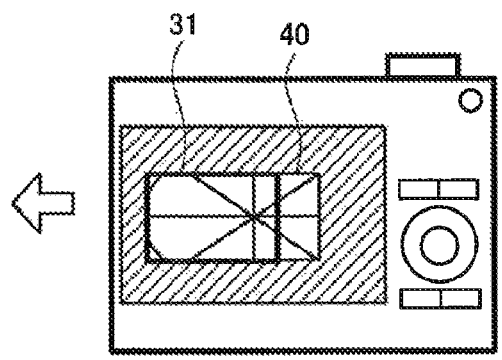
Figure 7B:
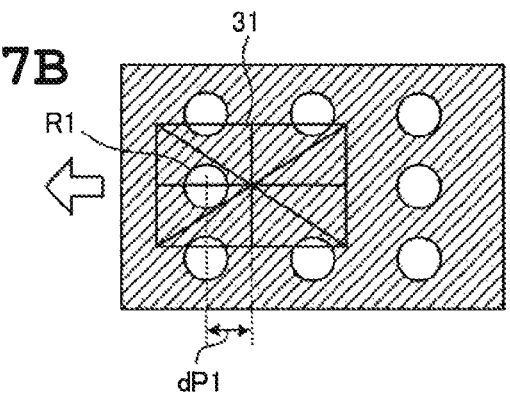
Figure 7C:
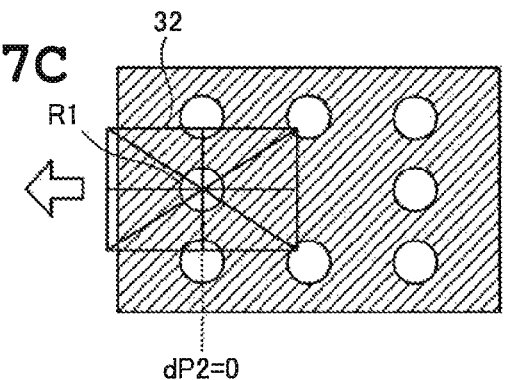

For example, in the state shown in FIG. 6B, the center position of a captured image 31 is nearest to the center of the imaging area R1 as shown in FIG. 7B. Therefore, the imaging area R1 is identified as the nearest area. In this instance, because an image has not yet been stored for the imaging area R1, the captured image 31 is corresponded with the imaging area R1, and stored with the distance information dP in the DRAM 31.

Next, the CPU 11 reduces the captured image P, and overwrites the blank area with the reduced captured image P (Step S34). That is, the captured image P and the reference image (or composite image) are combined so as to be partially overlapped with each other, and the canvas is overwritten with the composite image. Next, the CPU 11 displays the composite image on the image display section 15 (Step S38).

For example, in the example shown in FIG. 6B, the captured image 31 and the reference image 30 are combined so as to be partially overlapped with each other, and a composite image 40 generated thereby is displayed on the image display section 15.

Next, the CPU 11 judges whether or not the consecutive image capturing mode has been terminated (ordinarily, the consecutive image capturing mode is terminated by user operation, such as by the shutter SW being released) (Step S40). When judged that the consecutive image capturing mode has not been terminated, the CPU 11 returns to Step S20 and repeats the above-described processing.

Conversely, when judged at Step S28 that an image for the imaging area has already been stored, the CPU 11 judges whether or not the distance dP of the captured image P is shorter than the distance dP of the stored image (Step S30). When judged that the distance dP of the captured image P is shorter than the distance dP of the stored image, since the captured image P is nearer to the imaging area than the stored image, or in other words, the captured image P is more suitable, the CPU 11 corresponds the captured image P with the imaging area, and stores the captured image P and the distance information dP in the DRAM 12 (overwrites the DRAM 12) at Step S32.

Figure 6C:
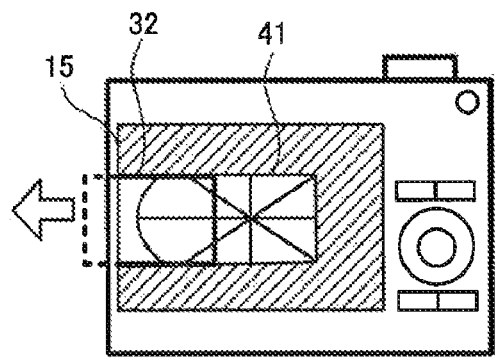

For example, in the state shown in FIG. 6B, when the user moves the image capturing direction of the digital camera 1 further to the left-hand side as shown in FIG. 6C, an image 32 is captured. In this instance, the image 31 and the distance information dP1 of the image 31 have already been stored in the imaging area R1.

The distance dP2 between the center of the captured image 32 and the center of the imaging area R1 is shorter than the distance dP1 of the image 31 which has already been stored. Therefore, the captured image 32 is corresponded with the imaging area R1, and the captured image 32 and the distance information dP2 are stored in the DRAM 12. That is, the image 31 and the distance information dP1 stored earlier are overwritten.

Next, at Step S34, the CPU 11 reduces the captured image P, and overwrites the blank area with the reduced captured image P, or in other words, combines the captured image P and the reference image (or composite image) so that they are partially overlapped with each other. Next, at Step S38, the CPU 11 displays the composite image on the image display section 15. In the example shown in FIG. 6C, the captured image 32 and the reference image 30 are combined so as to be partially overlapped with each other, and a composite image 41 generated thereby is displayed on the image display section 15. Then, when judged that the consecutive image capturing mode has not been terminated, the CPU 11 returns to Step S20 and repeats the above-described processing.

Conversely, when judged that the distance dP of the captured image P is greater than the distance dP of the image that has already been stored (NO at Step S30), the CPU 11 judges that the captured image P is not more suitable than the stored image, and discards the captured image P and the distance information dP (Step S36). Therefore, in this case, the image that has already been stored remains in the DRAM 12. Then, the CPU 11 displays the composite image on the image display section 15 at Step S38 and, if the consecutive image capturing mode has not been terminated, returns to Step S20 to repeat the above-described processing.

Figure 6D:
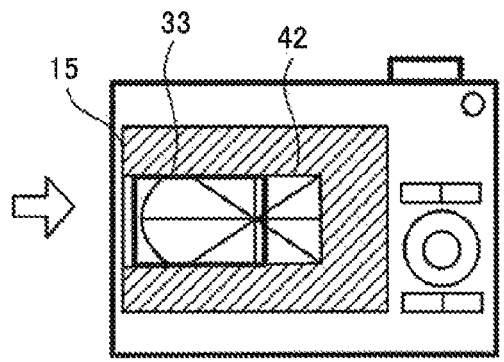
Figure 7D:
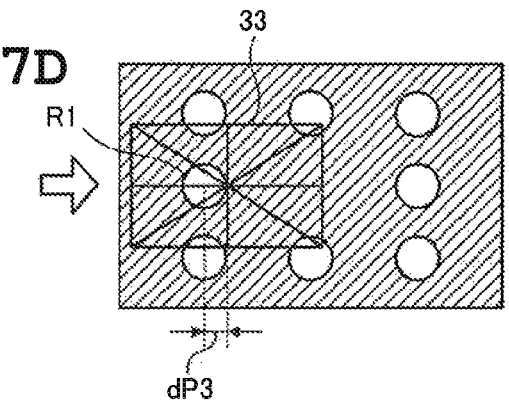

For example, in the state shown in FIG. 6C, when the user moves the image capturing direction of the digital camera 1 to the right-hand side as shown in FIG. 6D, an image 33 is captured. In this instance, the image 32 has already been stored, and the distance dP3 of the captured image 33 is greater than the distance dP2 of the image 32 as shown in FIG. 7D. Therefore, the captured image 33 and the distance information dP3 thereof are discarded, and the captured image 32 that has already been stored remains in the DRAM 12 as the image for the imaging area R1.

Subsequently, the same processing is repeated for all imaging areas R1 to R8. Then, when the consecutive image capturing mode is terminated by user instruction, the CPU 11 positions and combines a plurality of captured images respectively stored for the imaging areas so that they are partially overlapped, and consequently generates an image with a wide viewing angle such as that shown in FIG. 2 (Step S42).

According to the above-described first embodiment, a plurality of imaging areas are set in the canvas in advance and, during consecutive image capturing at a predetermined cycle (time interval), the canvas is repeatedly updated such that only a single most suitable captured image is kept for each of the set imaging areas as an image used for image composition. Since images other than suitable images (images other than those nearest to the set imaging areas) are discarded even if they have been captured, the memory capacity is not strained. That is, a plurality of images necessary for generating an image with a wide viewing angle that cannot be acquired by a single shot can be efficiently captured with the minimum memory capacity required for acquiring the image with a wide viewing angle.

Moreover, because only a single captured image is stored for each of set imaging areas and other images are discarded, images can be consecutively and unlimitedly captured until an image required for generating an image with a wide viewing angle that cannot be acquired by a single shot is captured. As a result, the exactness of an image with a wide viewing angle is improved. In addition, an image with a wide viewing angle can be generated with a higher resolution, whereby the quality of an image with a wide viewing angle is improved.

Furthermore, in the wide-angle imaging mode of the first embodiment, images formed in the CCD 5 showing views in the current image capturing direction of the digital camera 1 are displayed on the image display section 15 in live view as preview images (low resolution) in real time, and a reduced image of the composite image is also displayed on the image display section 15. Therefore, the user can easily confirm a direction in which the digital camera 1 should be pointed next.

B. Second Embodiment

Next, a second embodiment of the present invention will be described.

In the wide-angle imaging mode of the second embodiment, when the user depresses the shutter SW, a mark indicating a direction in which the digital camera 1 should be pointed is displayed on the image display section 15, thereby guiding the user in the image capturing direction of the digital camera 1.

More specifically, the blank area of the canvas is divided into a plurality of imaging areas in advance. In the wide-angle imaging mode, a mark (such as a white mark) is displayed in the center position of each divided imaging area in a predetermined sequence, and a mark (such as a yellow mark) indicating a center position is displayed in the center of the preview image of a view in a direction in which the digital camera 1 is pointing.

The user is only required to move the image capturing direction of the digital camera 1 so that the mark (such as a yellow mark) indicating the center position displayed in the center of the preview image is moved toward the mark (such as a white mark) displayed in the center of the imaging area.

In the wide-angle imaging mode of the digital camera 1, images are consecutively captured at a predetermine cycle (time interval) as in the case of the first embodiment, and only a single nearest image is kept for each set imaging area as an image used for image composition, whereas other images (images other than the nearest image) are discarded even if they have been captured.

Then, in a certain imaging area, when the distance between the center of the imaging area and the center of the stored captured image is equal to or less than a predetermined threshold value, a judgment is made that an image for the imaging area has been acquired, and the mark is moved to and displayed in a next imaging area. This operation is sequentially performed for all imaging areas, thereby storing a plurality of captured images (high-quality images) necessary for generating an image with a wide viewing angle. Note that the structure of the digital camera 1 is the same as that of the first embodiment, and therefore explanation thereof is omitted.

Figure 8:
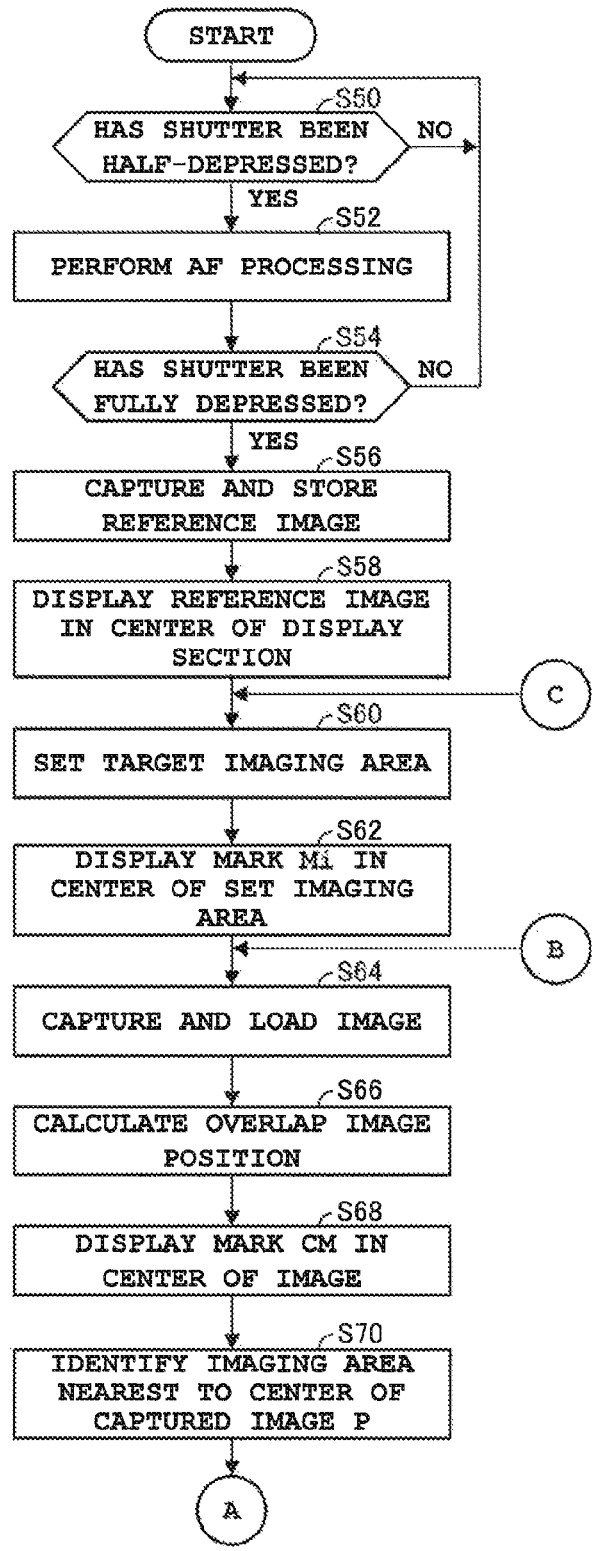
FIG. 8 is a flowchart for explaining operations of a digital camera according to a second embodiment.
Figure 9:
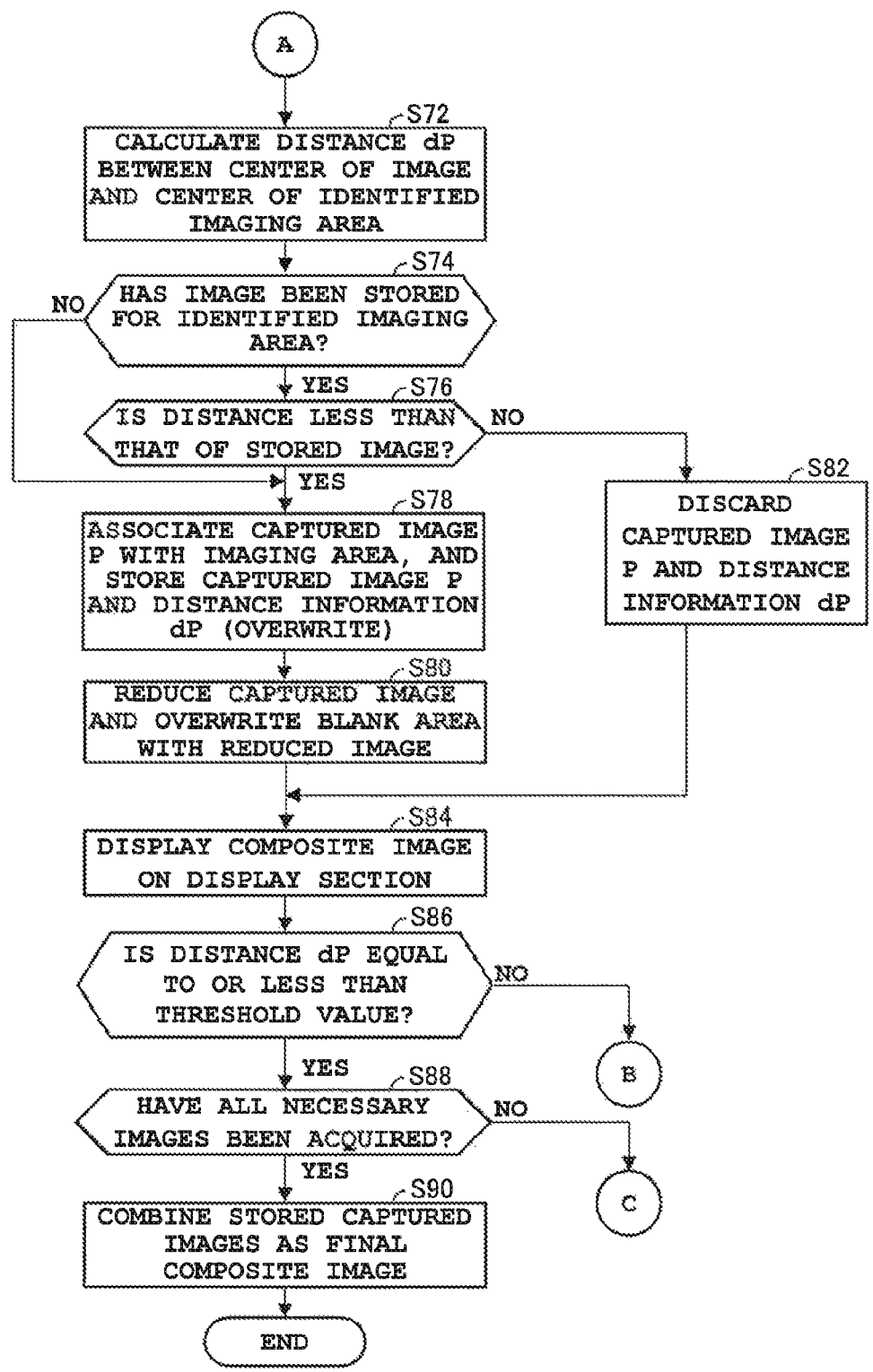
FIG. 9 is a flowchart for explaining operations of the digital camera according to the second embodiment.

FIG. 8 and FIG. 9 are flowcharts for explaining operations of the digital camera 1 according to the second embodiment. FIG. 10A to FIG. 10D are schematic diagrams showing operations of the digital camera 1 and display examples of the image display section 15 according to the second embodiment.

First, the CPU 11 judges whether or not the shutter SW has been half-depressed (Step S50). When judged that the shutter SW has not been half-depressed, the CPU 11 repeatedly performs Step S50. Conversely, when judged that the shutter SW has been half-depressed, the CPU 11 performs auto-focus (AF) processing (Step S52) and judges whether or not the shutter SW has been fully depressed (Step S54). When judged that the shutter SW has not been fully depressed, the CPU 11 repeatedly performs Step S50 and Step S52.

Figure 10A:
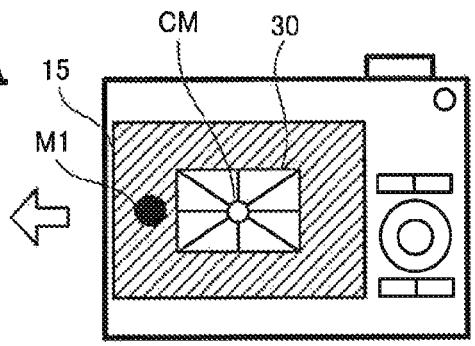
FIG. 10A to FIG. 10D are schematic diagrams for explaining operations of the digital camera and display examples of an image display section according to the second embodiment.

Conversely, when judged that the shutter SW has been fully depressed, the CPU 11 first captures a first image (high resolution) as a reference image, and after storing the captured image in the DRAM 12 (Step S56), displays a reduced image 30 of the reference image in the center of the image display section 15 as shown in FIG. 10A (Step S58).

Then, the CPU 11 sets any one of the plurality of imaging areas set in advance as a target imaging area Ri (Step S60), and displays a mark Mi (i=1, 2, . . . , 8) indicating the target imaging area Ri on the image display section 15 (Step S62).

Next, in the digital camera 1, the CPU 11 captures and loads an image (Step S64), and calculates an overlap image position (Step S66). The calculation of an overlap image position herein refers to, for example, a calculation in which the center position (coordinates) of a captured image is calculated, and after the captured image and the reference image (or composite image) are positioned so as to be partially overlapped with each other, the position of the captured image within the canvas (or a relative position relative to the reference image) is calculated.

Figure 10B:
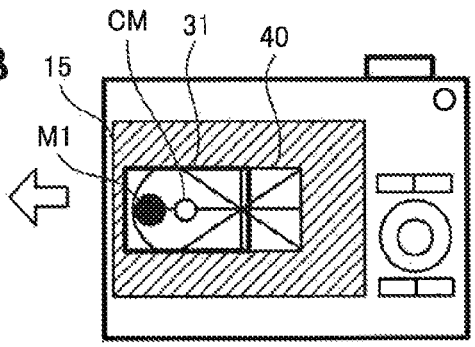

Then, as shown in FIG. 10A and FIG. 10B, the CPU 11 displays a mark CM in the center of the captured image (Step S68). The user moves the image capturing direction of the digital camera 1 so as to move the mark CM indicating the center of a preview image currently being displayed in live view towards the direction of a mark M1 (left-hand direction). When the user moves the image capturing direction of the digital camera 1 in the direction of the mark M1 (left-hand direction), the preview image 31 also moves in the left-hand direction relative to the reference image 30, as shown in FIG. 10B.

Next, the CPU 11 identifies the imaging area nearest to the center position of the captured image P (Step S70), and calculates the distance dP between the center of the captured image P and the center of the identified imaging area (Step S72). The CPU 11 then judges whether or not an image has already been stored for the imaging area (Step S74). When judged that an image has not yet been stored, or in other words, the captured image P is the first image for the imaging area, the CPU 11 corresponds the captured image P with the imaging area, and stores the captured image P and the distance information dP in the DRAM 12 (overwrites the DRAM 12) (Step S78).

For example, as shown in FIG. 10B, the center position of the captured image 31 is nearest to the center of the imaging area R1 (mark M1 on the image display section 15), and therefore the imaging area R1 is identified as the nearest imaging area. In this instance, no image has been stored for the imaging area R1, and therefore the captured image 31 is corresponded with the imaging area R1 and stored with the distance information dP1 in the DRAM 12.

Next, the CPU 11 reduces the captured image and overwrites the blank area with the reduced captured image (Step S80). That is, the captured image P and the reference image (or composite image) are combined so as to be partially overlapped with each other, and the canvas is overwritten with the composite image. Then, the CPU 11 displays the composite image on the image display section 15 (Step S84). For example, in the example shown in FIG. 10B, the captured image 31 and the reference image 30 are combined so as to be partially overlapped with each other, and the composite image 40 is displayed on the image display section 15.

Next, the CPU 11 judges whether or not the distance dP of the captured image P is equal to or less than a predetermined threshold value (Step S86). When judged that the distance dP of the captured image P is greater than the predetermined threshold, since an image more suitable for the area may be captured, the CPU 11 returns to Step S64 and repeats the above-described processing on the next captured image.

Conversely, when judged at Step S74 that an image for the area has already been stored, the CPU 11 judges whether or not the distance dP of the captured image P is shorter than the distance dP of the stored image (Step S76). When judged that the distance dP of the captured image P is shorter than the distance dP of the stored image, since the captured image P is more suitable than the stored image, the CPU 11 corresponds the captured image P with the imaging area, and stores the captured image P and the distance information dP in the DRAM 12 (overwrites the DRAM 12) at Step S78.

Figure 10C:
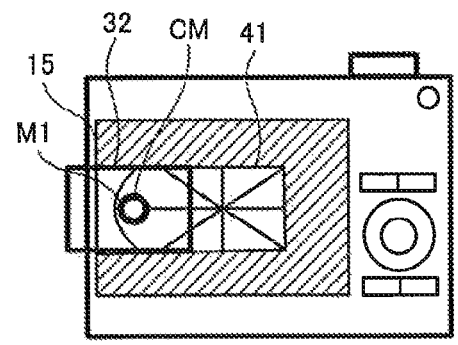

For example, in the state shown in FIG. 10B, when the user moves the image capturing direction of the digital camera 1 further towards the left-hand side as shown in FIG. 10C, an image 32 is captured. In this instance, the image 31 and the distance information dP1 thereof have already been stored in the imaging area R1 corresponding to the mark M1.

The distance dP2 between the center of the captured image 32 and the center of the imaging area R1 is shorter than the distance dP1 of the image 31 that has already been stored. Therefore, the captured image 32 is judged to be more suitable than the stored image 31. Accordingly, the captured image 32 is corresponded with the imaging area R1, and the captured image 32 and the distance information dP2 are stored in the DRAM 12. That is, the image 31 and the distance information dP1 stored earlier are overwritten.

Next, at Step S80, the CPU 11 reduces the captured image P, and combines the captured image P and the reference image (or composite image) so that they are partially overlapped with each other. Then, at Step S84, the CPU 11 displays the composite image on the image display section 15. In the example shown in FIG. 10C, the captured image 32 and the reference image 30 are combined so as to be partially overlapped with each other, and the composite image 41 is displayed on the image display section 15.

Conversely, when judged that the distance dP of the captured image P is greater than the distance dP of the image that has already been stored, the CPU 11 discards the captured image P and the distance information dP (Step S82). In this case, the image that has already been stored remains in the DRAM 12. Then, at Step S84, the CPU 11 displays the composite image on the image display section 15.

Figure 10D:
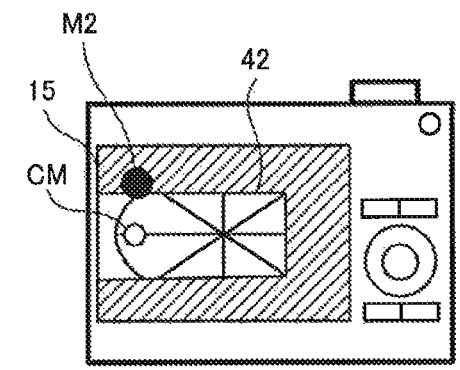

During the above-described consecutive image capturing, the CPU 11 judges whether or not the distance dP of the stored image is equal to or less than a predetermined threshold (Step S86). When judged that the distance dP of the captured image is equal to or less than a predetermined threshold, the CPU 11 judges that a sufficiently suitable image has been stored for the imaging area, and judges whether or not all necessary images have been acquired (Step S88). When judged that not all necessary images have been acquired, the CPU 11 returns to Step S60 and sets a next imaging area R2 as a target area from among the plurality of imaging areas, as shown in FIG. 10D. Then, at Step S62, the CPU 11 displays a mark M2 indicating the imaging area on the image display section 15. Thereafter, the same processing is repeated for the imaging area R2 (mark M2).

When all images necessary for generating an image with a wide viewing angle are acquired, the CPU 11 positions and combines this plurality of captured images respectively stored for the imaging areas so that they are partially overlapped, and consequently generates an image with a wide viewing angle such as that shown in FIG. 2 (Step S90).

According to the above-described second embodiment, a plurality of imaging areas are set in the canvas in advance and, during consecutive image capturing at a predetermined cycle (time interval), only a single most suitable captured image is kept for each of the set imaging areas as an image used for image composition. Since images other than the suitable images (images other than those nearest to the set imaging areas) are discarded even if they have been captured, the memory capacity is not strained. Therefore, a plurality of images necessary for generating an image with a wide viewing angle that cannot be acquired by a single shot can be efficiently captured with the minimum memory capacity required for acquiring the image with a wide viewing angle.

In addition, because only a single captured image is stored for a set imaging area and other images are discarded, images can be consecutively and unlimitedly captured until an image required for generating an image with a wide viewing angle that cannot be acquired by a single shot is captured. As a result, the exactness of an image with a wide viewing angle can be improved. In addition, an image with a wide viewing angle can be generated with a higher resolution, whereby the quality of an image with a wide viewing angle can be improved.

Moreover, in the wide-angle imaging mode, a composite image is displayed on the image display section 15 and the mark M indicating an area to be captured is displayed in real time. As a result, by moving the digital camera 1 to follow the mark M, the user can easily and efficiently capture a plurality of images necessary for generating an image with a wide viewing angle that cannot be acquired by a single shot, whereby an image with a wide viewing angle can be easily generated.

C. Third Embodiment

Next, a third embodiment of the present invention will be described.

According to the third embodiment, the blank area of the canvas is divided into a plurality of imaging areas in advance. In the wide-angle imaging mode, a plurality of marks (such as white marks) are displayed in advance in the center positions of the imaging areas on the image display section 15, and a mark (such as a yellow mark) indicating a center position is displayed in the center of the preview image of a view in a direction in which the digital camera 1 is pointing.

The user is only required to move the image capturing direction of the digital camera 1 so that the mark (such as a yellow mark) indicating the center position displayed in the center of the preview image is moved toward each of the marks (such as white marks) displayed in the center positions of the imaging areas, in sequence.

In the wide-angle imaging mode of the digital camera 1, images are consecutively captured at a predetermined cycle (time interval) as in the cases of the above-described first and second embodiments, and only a single more suitable image is kept for each set imaging area as an image used for image composition, whereas other images are discarded even if they have been captured.

Then, in a certain imaging area, when the distance dP between the center of the imaging area and the center of the stored captured image equal to or less than a predetermined threshold value, a judgment is made that an image for the imaging area has been acquired, and the color of the mark indicating the center of the imaging area changes. This operation is sequentially performed for all imaging areas, thereby storing a plurality of captured images (high-quality images) necessary for generating an image with a wide viewing angle. Note that the structure of the digital camera 1 is the same as that of the first embodiment, and therefore explanation thereof is omitted.

Figure 12:
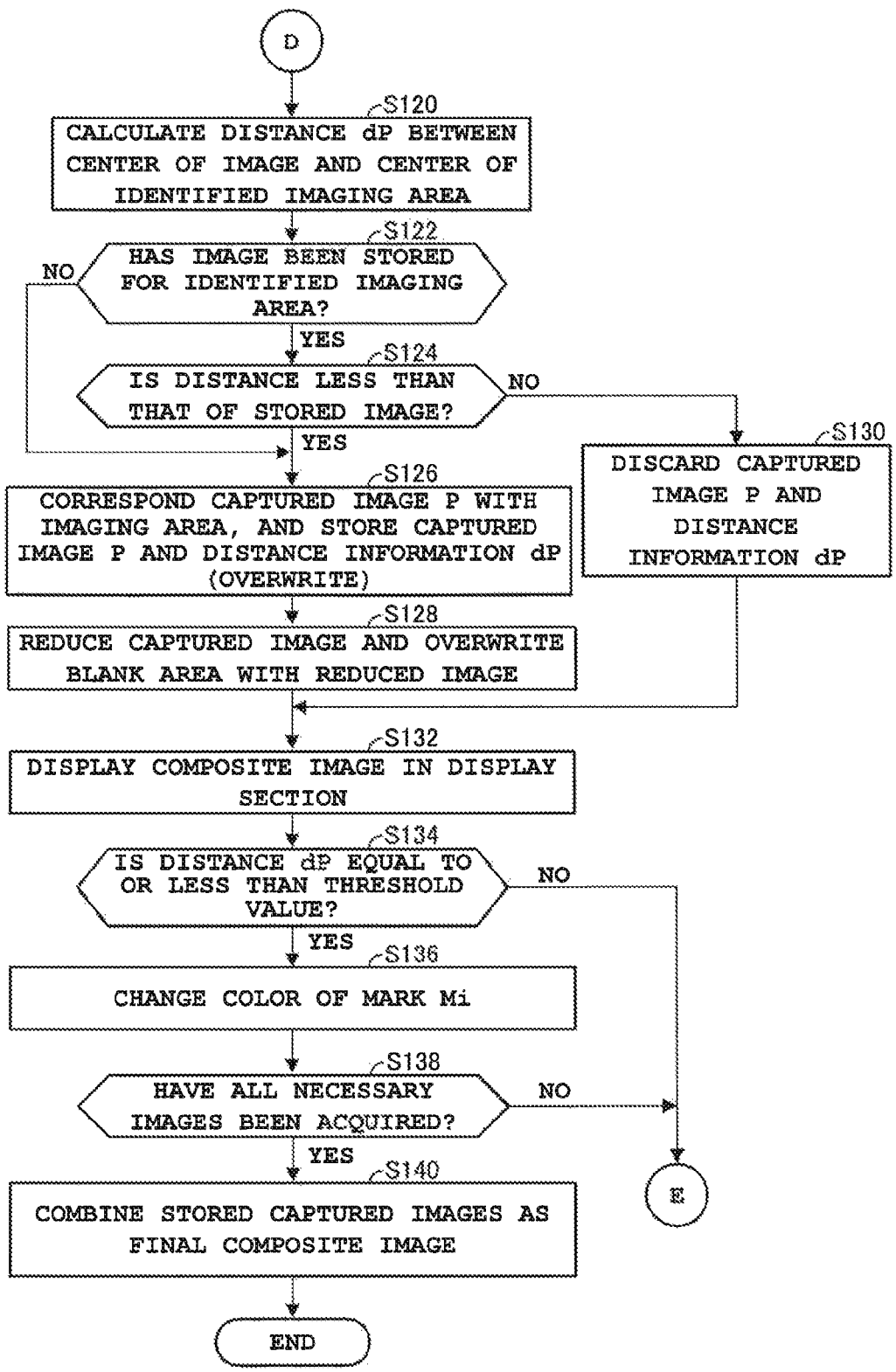
FIG. 12 is a flowchart for explaining operations of the digital camera according to the third embodiment.

FIG. 11 and FIG. 12 are flowcharts for explaining operations of the digital camera 1 according to the third embodiment. FIG. 13A to FIG. 13D are schematic diagrams showing operations of the digital camera 1 and display examples of the image display section 15 according to the third embodiment.

First, the CPU 11 judges whether or not the shutter SW has been half-depressed (Step S100). When judged that the shutter SW has not been half-depressed, the CPU 11 repeatedly performs Step S100. Conversely, when judged that the shutter SW has been half-depressed, the CPU 11 performs auto-focus (AF) processing (Step S102) and judges whether or not the shutter SW has been fully depressed (Step S104). When judged that the shutter SW has not been fully depressed, the CPU 11 repeatedly performs Step S100 and Step S102.

Figure 13A:
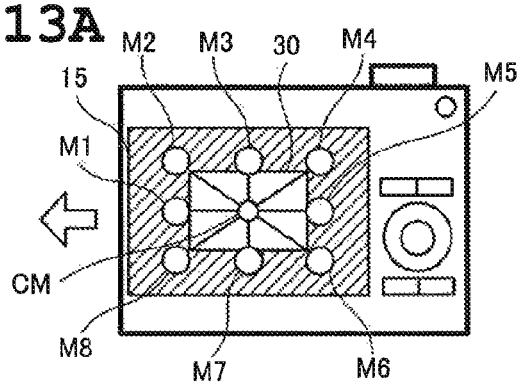
FIG. 13A to FIG. 13D are schematic diagrams for explaining operations of the digital camera and display examples of an image display section according to the third embodiment.

Conversely, when judged that the shutter SW has been fully depressed, the CPU 11 first captures a first image (high resolution) and stores the captured image as a reference image 30 (Step S106). As shown in FIG. 13A, the CPU 11 displays a reduced image of the reference image 30 in the center of the image display section 15 (Step S108). Then, as shown in FIG. 13A, the CPU displays marks M1 to M8 (such as white marks) indicating a plurality of imaging areas set in advance (Step S110).

Next, in the digital camera 1, the CPU 11 captures and loads an image (Step S112), and calculates an overlap image position (Step S114). The calculation of an overlap image position herein refers to, for example, a calculation in which the center position (coordinates) of a captured image is calculated, and after the captured image and the reference image (or composite image) are positioned so as to be partially overlapped with each other, the position of the captured image within the canvas (or a relative position relative to the reference image) is calculated.

Figure 13B:
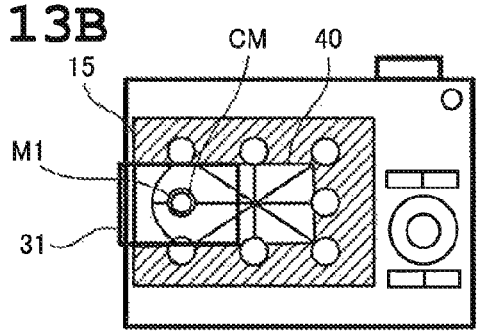

Then, as shown in FIG. 13A and FIG. 13B, the CPU 11 displays a mark CM (such as a yellow mark) in the center of the captured image (Step S116). When the user confirms the marks M1 to M8, the user moves the image capturing direction of the digital camera 1 so as to move the mark CM indicating the center of a preview image currently being displayed in live view towards, for example, the direction of the mark M1. When the user moves the image capturing direction of the digital camera 1 in the direction of the mark M1 (left-hand direction), the preview image 31 also moves in the left-hand direction relative to the reference image 30, as shown in FIG. 13B.

Next, the CPU 11 identifies the imaging area nearest to the center position of the captured image P (Step S118), and calculates the distance dP between the center of the captured image P and the center of the identified imaging area (Step S120). The CPU 11 then judges whether or not an image has already been stored for the imaging area (Step S122). When judged that an image has not yet been stored, or in other words, the captured image P is the first image for the imaging area, the CPU 11 corresponds the captured image P with the imaging area, and stores the captured image P and the distance information dP in the DRAM 12 (overwrites the DRAM 12) (Step S126).

For example, as shown in FIG. 13B, the center position of the captured image 31 is nearest to the center of the imaging area R1 (mark M1 on the image display section 15), and therefore the imaging area R1 is identified as the nearest imaging area. In this instance, no image has been stored for the imaging area R1, and therefore the captured image 31 is corresponded with the imaging area R1 and stored with the distance information dP1 in the DRAM 12.

Next, the CPU 11 reduces the captured image P and overwrites the blank area with the reduced captured image (Step S128). That is, the captured image P and the reference image (or composite image) are combined so as to be partially overlapped with each other, and the canvas is overwritten with the composite image. Then, the CPU 11 displays the composite image on the image display section 15 (Step S132).

For example, in the example shown in FIG. 13B, the captured image 31 and the reference image 30 are combined so as to be partially overlapped with each other, and the composite image 40 is displayed on the image display section 15.

Next, the CPU 11 judges whether or not the distance dP of the captured image P is equal to or less than a predetermined threshold value (Step S134). When judged that the distance dP of the captured image P is greater than the predetermined threshold, since an image more suitable for the imaging area may be captured, the CPU 11 returns to Step S112 and repeats the above-described processing on the next captured image.

Conversely, when judged at Step S122 that an image for the imaging area has already been stored, the CPU 11 judges whether or not the distance dP of the captured image P is shorter than the distance dP of the stored image (Step S124). When judged that the distance dP of the captured image P is shorter than the distance dP of the stored image, since the captured image P is more suitable than the stored image, the CPU 11 corresponds the captured image P with the imaging area, and stores the captured image P and the distance information dP in the DRAM 12 (overwrites the DRAM 12) at Step S126.

Conversely, when judged that the distance dP of the captured image P is greater than the distance dP of the image that has already been stored, the CPU 11 discards the captured image P and the distance information dP (Step S130). In this case, the image that has already been stored remains in the DRAM 12. Then, at Step S132, the CPU 11 displays the composite image on the image display section 15.

When the distance dP of a stored captured image is equal to or less than a predetermined threshold, the CPU 11 judges that a sufficiently suitable image has been stored for the imaging area, and changes the color of the mark Mi indicating the imaging area to green (Step S136). Then, the CPU 11 judges whether or not all necessary images have been acquired (Step S138). In the example shown in FIG. 13C, the color of the mark M1 indicating the imaging area R1 is changed to green. When judged that not all necessary images have been acquired, the CPU 11 returns to Step S112 and repeats the same processing on the next imaging area.

Figure 13C:
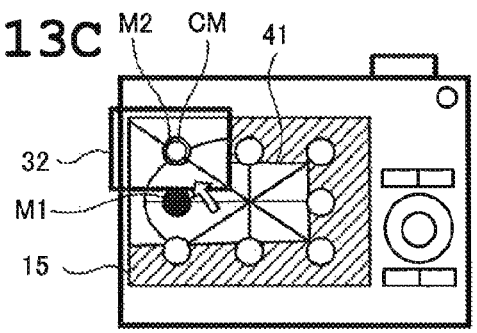
Figure 13D:
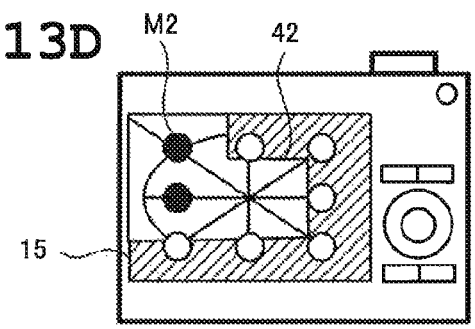

That is, when the color of the mark M1 changes to green, the user moves the digital camera 1 (changes the image capturing direction) so as to move the mark CM indicating the center of a preview image towards the next mark M2, as shown in FIG. 13C. Then, when a captured image whose distance dP from the mark M2 is equal to or less than a predetermined threshold value is stored, the color of the mark M2 is changed, and after its reduced image is combined with the reference image (or composite image), the composite image 42 is displayed on the image display section 15 as shown in FIG. 13D. This operation is continued until all the colors of the marks M1 to M8 are changed to green. The user is only required to move the digital camera 1 to follow the marks M1 to M8 displayed on the image display section 15.

When all necessary images are acquired, the CPU 11 positions and combines these plurality of captured images respectively stored for the imaging areas so that they are partially overlapped, and consequently generates an image with a wide viewing angle such as that shown in FIG. 2 (Step S140).

According to the above-described third embodiment, a plurality of imaging areas are set in the canvas in advance and, during consecutive image capturing at a predetermined cycle (time interval), only a single most suitable image is kept for each of the set imaging areas as an image used for image composition. Since images other than the suitable images (images other than those nearest to the set imaging areas) are discarded even if they have been captured, the memory capacity is not strained. Therefore, a plurality of images necessary for generating an image with a wide viewing angle that cannot be acquired by a single shot can be efficiently captured with the minimum memory capacity required for acquiring the image with a wide viewing angle.

In addition, because only a single captured image is stored for each set imaging area and other images are discarded, images can be consecutively and unlimitedly captured until an image required for generating an image with a wide viewing angle that cannot be acquired by a single shot is captured. As a result, the exactness of an image with a wide viewing angle can be improved. In addition, an image with a wide viewing angle can be generated with a higher resolution, whereby the quality of an image with a wide viewing angle can be improved.

Moreover, in the wide-angle imaging mode, a composite image is displayed on the image display section 15 and the marks M indicating areas to be captured are displayed in real time. In addition, marks indicating captured areas and marks indicating uncaptured areas are displayed in different colors. As a result, by moving the digital camera 1 to follow the mark M, the user can easily and efficiently capture a plurality of images necessary for generating an image with a wide viewing angle that cannot be acquired by a single shot, whereby an image with a wide viewing angle can be easily generated.

In the above-described first, second, and third embodiments, the movement of the digital camera 1 (change in the image-capture direction) is judged based on the relative positional relationship of a captured image to the reference image. However, the movement may be judged using the low-resolution preview image.

In addition, a sensor section such as an acceleration sensor that is capable of detecting the movement of the digital camera 1 may be used to assist the judgment. Through the use of a sensor section such as this, particularly when a subject whose position in a captured image or a preview image cannot be accurately acquired, such as a subject not having characteristics in terms of contrast, is being captured, the position of the captured image or the preview image relative to the reference image can be identified based on the movement of the digital camera 1 detected by the acceleration sensor.

Moreover, the colors of the marks M indicating imaging areas are not limited to those described above. In addition, the marks may be accompanied by visual effects such as flashing, and may be of a shape other than a dot, such as a star or a heart. In particular, rather than the color of the mark being changed, the shape of the mark may be changed, after an image for the imaging area is stored. Alternatively, the mark may be deleted after an image for the imaging area is stored.

Furthermore, in the above-described first to third embodiments, a digital camera is described as the imaging apparatus. However, the present invention is not limited thereto, and is applicable to any electronic device having an imaging function, such as a mobile phone. In addition, a configuration may be used in which the present invention is actualized by the CPU 11 running a predetermined program stored in a program memory (not shown).

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
    a capturing section which captures an image at a first viewing angle;
    a capturing control section which performs consecutive image capturing at a predetermined cycle by the capturing section;
    a setting section which sets a plurality of areas to be captured at the first viewing angle so as to generate a composite image reproducing a captured image at a second viewing angle wider than the first viewing angle by combining a plurality of images acquired by a plurality of image capturing operations performed by the capturing control section;
    a judgment section which judges whether or not a captured image in the consecutive image capturing by the capturing control section is a suitable image for any one of the plurality of areas set by the setting section; and
    a recording control section which corresponds the captured image in the consecutive image capturing by the capturing control section with an area and records the captured image in the consecutive image capturing by the capturing control section in a recording section, when the judgment section judges that the captured image in the consecutive image capturing by the capturing control section is a suitable image;

wherein the judgment section further judges whether or not the captured image in the consecutive image capturing by the capturing control section is more suitable for an area than a previously recorded image by corresponding a recorded image in comparison with a previously recorded image, when an image that was previously recorded in the recording section exists.

2. The imaging apparatus according to claim 1, wherein the recording section records a more suitable image by updating the previously recorded image with the captured image in the consecutive image capturing by the capturing control section, when the judgment section judges that the captured image in the consecutive image capturing by the capturing control section is more suitable for an area than a previously recorded image by corresponding a recorded image in comparison with a previously recorded image.

3. The imaging apparatus according to claim 2, wherein the recording section discards a non-suitable captured image, when the judgment section judges that the captured image in the consecutive image capturing by the capturing control section is less suitable for an area than previously recorded by corresponding a recorded image in comparison with a previously recorded image.

4. The imaging apparatus according to claim 1, further comprising:
a display section; and
a first display control section which displays information indicating the plurality of areas set by the setting section on the display section.

5. The imaging apparatus according to claim 4, wherein the first display control section displays a mark as information indicating any one of the plurality of areas and, when a suitable image is recorded in the recording section for an area corresponding to the mark, displays the mark in another area for which a suitable image has not been recorded in the recording section among the plurality of areas.

6. The imaging apparatus according to claim 4, wherein the first display control section displays a plurality of marks as information respectively indicating the plurality of areas and, when a suitable image is recorded in the recording section for an area corresponding to any one of the plurality of marks, changes a display manner of the mark corresponding to the area.

7. The imaging apparatus according to claim 1, further comprising:
a second display control section which displays each of images sequentially loaded by the capturing section in a position corresponding to a current image capturing direction with reference to an image capturing position of a reference image, when displaying an image on the display section as a preview image.

8. The imaging apparatus according to claim 1, wherein the judgment section judges whether or not a captured image in the consecutive image capturing by the capturing control section is suitable for any one of the plurality of areas set by the setting section, based on whether or not an area covered by the image in the consecutive image capturing by the capturing control section substantially coincides with any one of the plurality of areas set by the setting section.

9. The imaging apparatus according to claim 1, further comprising a composite section which generates a composite image with a second viewing angle that is wider than the first viewing angle by combining a plurality of most suitable images recorded in the recording section.

10. A non-transitory computer-readable storage medium having stored thereon a program that is executable by a computer in an imaging apparatus including a capturing section which captures an image at a first viewing angle and a memory for recording images, the program being executable by the computer to perform functions comprising:
capturing control processing for performing consecutive image capturing at a predetermined cycle by the capturing section;
setting processing for setting a plurality of areas to be captured at the first viewing angle so as to generate a composite image reproducing a captured image at a second viewing angle wider than the first viewing angle by combining a plurality images acquired by a plurality of image capturing operations performed in the capturing control processing;
judgment processing for judging whether or not a captured image in the consecutive image capturing in the capturing control processing is a suitable image for any one of the plurality of areas set in the setting processing; and
recording control processing for corresponding the captured image in the consecutive image capturing in the capturing control processing with an area and recording the captured image in the consecutive image capturing in the capturing control processing in the memory, when the judgment processing judges that the captured image in the consecutive image capturing in the capturing control processing is a suitable image;
wherein the judgment processing further judges whether or not the captured image in the consecutive image capturing by the capturing control processing is more suitable for an area than a previously recorded image by corresponding a recorded image in comparison with a previously recorded image, when an image that was previously recorded in the memory exists.

* * * * *